July 3, 1962

L. B. McMANIS 3,042,754

TWO CHANNEL PHASE MODULATION

Filed April 14, 1961

Louis B. McManis
INVENTOR.

BY

ATTORNEY 3,042,754
TWO CHANNEL PHASE MODULATION
Louis B. McManis, Houston, Tex., assignor to Dresser Industries, Inc., Dallas, Tex., a corporation of Delaware
Filed Apr. 14, 1961, Ser. No. 103,111
7 Claims. (Cl. 179—100.2)

This invention relates to magnetically recording and reproducing a signal on and from a magnetic record medium and, more particularly, to a method and apparatus for recording a signal with high signal to noise ratio and low distortion.

There are many instances at the present time when it is desirable to record a signal on a magnetic medium for later use of the signal. One specific example is in connection with correction of records obtained in seismic exploration. As is well known, such records are obtained by detonating a shot underneath the earth and recording the resultant seismic waves received at a plurality of spaced positions along the surface of the earth. In order that the signals may be correlated as to time, it is conventional to correct them for "step-out" or "move-out," of the signals during the time period in which seismic waves are received at the various reception points. One particular apparatus that has been designed for this function employs a magnetic recorder which records the signal on a rotating magnetic drum and which automatically varies the position of the pick-up head, with respect to the recording head, on the drum in accordance with a predetermined step-out correction function.

The method and apparatus of the present invention are designed specifically for use in apparatus such as that employed to correct for step-out, as described above, but the present invention is adapted for many other uses, as will be evident from the description to follow.

There are several different types of recording methods for magnetic record media. Contact recording, the actual physical contact of the recording head with the magnetic record member, is objectionable because of the resultant wear on the recording head, as well as the record member. That wear may result in such extensive changes in the characteristics of the recording head as to cause substantial distortion of the signal recorded, or the recording characteristics of a record member may eventually be destroyed.

Direct recording, without physical contact between the record member and the recording head, could also be used, but this method is subject to distortion when the speed at which the record member is advanced past the recording head is relatively high. When the speed of the record medium is such that the wave length of the signal recorded on the record member approaches the physical width of the recording head, amplitude excursions of the signal not representative of the true signal are obtained. Therefore, direct recording ofttimes is impractical.

A third possible method of recording involves the use of frequency modulation of a carrier by the signal to be recorded. Unfortunately, frequency modulation requires a relatively wide frequency spectrum, and it is difficult to record a signal through a wide frequency spectrum on a magnetic record member spaced from the recording head, without distortion of the recorded signal. Moreover, when the pick-up head must be moved with respect to the recording head, as in the method of step-out correction referred to above, the frequency modulation system and the movement of the pick-up head result in an inherent decrease in signal amplitude, which is undesirable.

Another possible method of recording for magnetic work is so-called "pulse width modulation," in which the signal controls the position of one of the leading and trailing edges of a pulse with respect to the other edge. Unfortunately, with some types of signals it is necessary to use very narrow spikes, and the limited high frequency response to a magnetic recording system prevents the use of such spikes. As a matter of fact, the spikes are translated in the recording process into distorted pulses which look more like a sine wave than spike pulses.

The method and apparatus of this invention are designed to take advantage of the characteristics of pulse width modulation without employing such high frequency requirements that a magnetic recording system cannot furnish a true recording of the signal. The method of this invention utilizes a pair of channels of the magnetic record member and records on one channel a simple square wave signal, while on the other channel a square wave signal, both of whose leading and trailing edges vary in position in accordance with the signal amplitude, is recorded. The signal recorded on the second channel is different from the usual pulse modulated signal in that both edges of each square wave change in position with the signal, rather than only one edge. In play-back of the recorded signal, the two channels are detected separately, and the detected signals are compared as to phase to obtain a signal containing both the square wave carrier and the modulating signal. This combined signal is then integrated to obtain the original signal.

The method and apparatus of the invention will now be more fully described in conjunction with a preferred embodiment thereof, as shown in the accompanying drawing.

Figure 1:
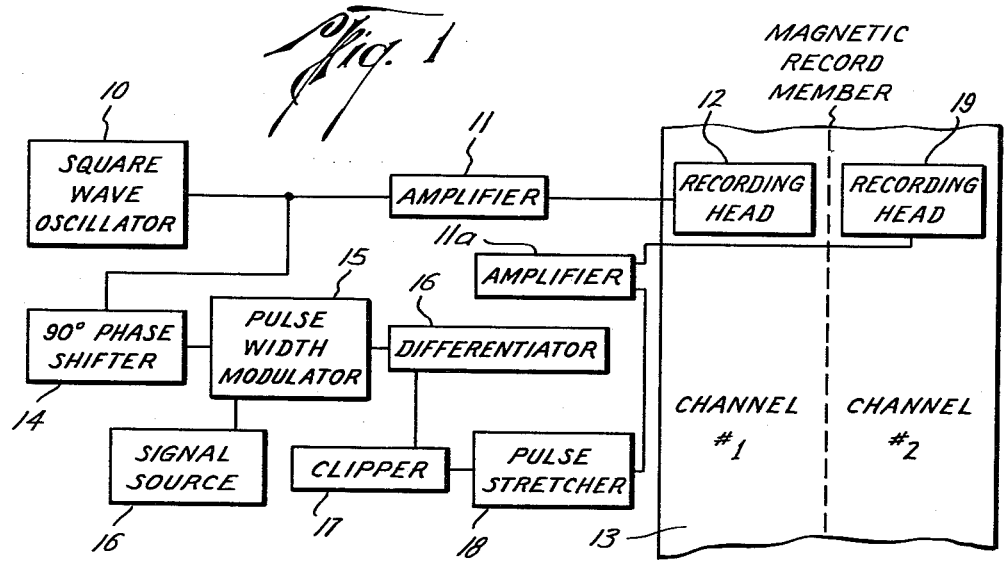
FIG. 1 is a schematic block diagram of a recording apparatus constructed in accordance with the principles of the invention.
Figure 2:
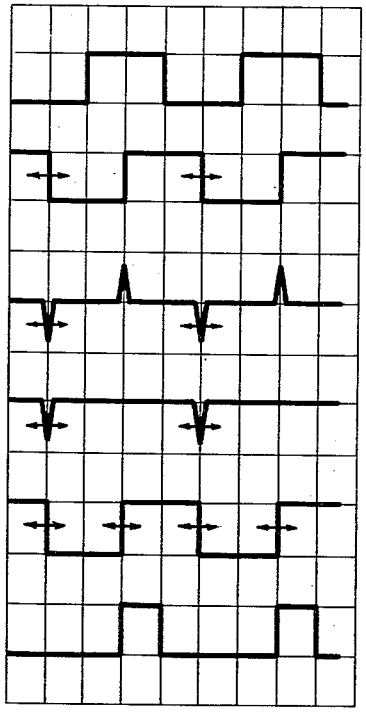
FIG. 2 is a representation of wave forms at various points of the apparatus of FIG. 1; and, FIG. 3 is a schematic block diagram of a reproducing apparatus to be used with the recording apparatus of FIG. 1.

The recording apparatus of FIG. 1 includes a square wave oscillator 10 which may be of conventional construction and which provides a train of periodic square pulses of voltage, such as shown in the first representation of FIG. 2. The voltage train or carrier output of the square wave oscillator is amplified in a conventional amplifier 11 and supplied to a conventional magnetic recording head 12. The recording head is positioned adjacent one channel of a magnetic record member 13 which moves relative to the recording head 12. Thereby, the square wave is recorded on the first channel of the magnetic record member.

The output of the square wave oscillator 10 is also supplied to a 90 degrees phase shifter 14 which merely adjusts the positions of the leading and trailing edges of each voltage pulse 90 degrees with respect to the reference pulses from the oscillator 10. The phase adjusted carrier is then connected to a pulse width modulator 15. The pulse width modulator may be of any conventional design well known in the art which is capable of changing the position of one of the leading and trailing edges of each pulse supplied it in accordance with the instantaneous amplitude of voltage from a signal source 16. As shown in FIG. 2, the output of the pulse width modulator 15 is a square wave whose trailing edges are modulated in position with respect to the leading edges in accordance with the amplitude of the signal.

The output of the pulse width modulator 15 is supplied to a differentiator 16 which converts the square pulses into positive and negative spikes of voltage corresponding to the leading and trailing edges of the square pulses. The negative spikes vary in position with respect to the positive spikes in accordance with amplitude of the signal, as shown in the third sketch of FIG. 2.

The output of differentiator 16 is applied to a clipper 17 which clips off the positive pulses of the wave, so that only the spikes corresponding to the trailing edges of the square wave pulses are supplied to a pulse stretcher 18. The pulse stretcher converts the negative spikes from the clipper into square waves which are substantially of the same width as those supplied by the square wave oscillator 10. This may be done, for instance, by multivibrator action. The output of the pulse stretcher indicated in the fifth sketch of FIG. 2, consists in square wave pulses of voltage, both the leading and trailing edges of each pulse of which vary synchronously in position in the same direction in accordance with the amplitude of the signal. This difference in position is, of course, with respect to the square wave supplied by oscillator 10.

The differentiator 16, the clipper 17 and the pulse stretcher 18 may all be of conventional design well known in the art. The output of the pulse stretcher is first amplified by amplifier 11a and then supplied to a second magnetic recording head 19, of conventional design. Recording head 19 records the signal shown in the fifth sketch of FIG. 2 on a second channel of the magnetic record member 13 adjacent and parallel to the first channel.

Figure 3:
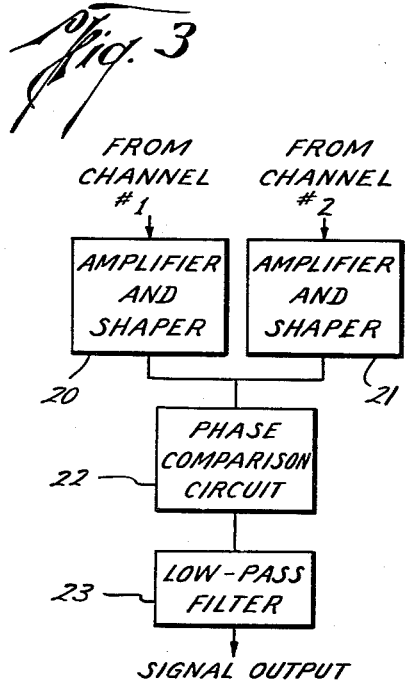

When the recorded signal is to be reproduced, the record member 13 is moved past a pair of magnetic pick-up heads, as is conventional, and the reference square wave signal recorded on the first channel is amplified and reshaped to compensate for distortion in the recording process in an amplifier and shaper 20, FIG. 3. The modulated square wave, which may be termed a phase-modulated wave, is supplied to a corresponding amplifier and shaper 21. The amplifiers and shapers 20 and 21 may also be of conventional design well known in the art, as is the phase comparison circuit 22 to which the outputs of the amplifiers 20 and 21 are supplied. The phase comparison circuit is provided to furnish a train of pulses corresponding to that normally obtained in a pulse position width modulator system. A representation of the type of output obtained from the phase comparison circuit is shown in the sixth sketch of FIG. 2. This train of pulses contains the high frequency carrier energy, as well as a signal information, so that the signal information is abstracted by passing this wave through a low pass filter 23, of conventional design. The low pass filter acts as an integrator, to discard the carrier energy and provide at its output the original signal.

The method and apparatus described herein provide a high signal to noise ratio signal which is of relatively low frequency range, so that much of the inherent distortion of a magnetic recording system is avoided. The various disadvantages of the recording systems mentioned in the first part of this specification are also avoided by this recording method.

It will be evident that many minor changes and additions to the method and apparatus of the present invention could be made without departure from the scope of the invention. Accordingly, the invention is to be considered limited only by the scope of the appended claims, and not by the specific embodiment disclosed herein.

I claim:

1. A method of recording a signal on a movable magnetic record medium which includes the steps of generating a train of periodic square wave oscillations, recording said train on one channel of the magnetic medium, varying the position of one of the leading and trailing edges of each square wave of the train with respect to the other in accordance with the instantaneous magnitude of the signal to obtain a pulse width modulated wave, differentiating the pulse width modulated wave, clipping all of the differentiated spikes of voltage corresponding to the reference one of the leading and trailing edges of the square wave modulated wave, stretching the retained spikes to reconstruct a train of square waves whose leading and trailing edges vary in phase together in accordance with the instantaneous amplitude of the signal, and simultaneously with recording said train recording the train of square waves thereby obtained on a channel of the magnetic record medium parallel to said one channel.

2. The method of claim 1 which includes the step of shifting the phase of the train of periodic square wave oscillations before modulating the train by the signal.

3. The method of recording on and playing back a signal from a magnetic record medium which includes the steps of generating a carrier wave of periodic square pulses of voltage, supplying the carrier wave directly to a magnetic recording head to record it on one channel of the record medium, modulating the width of the square wave pulses of the carrier in accordance with the instantaneous amplitude of the signal to vary the phase of one of the leading and trailing edges of each square wave pulse of the carrier, differentiating the modulated carrier to obtain positive spikes corresponding to the leading edges of the square wave pulses and negative spikes corresponding to the trailing edges thereof, clipping all of the spikes corresponding to the other of the leading and trailing edges of each square pulse, stretching the remaining spikes into square pulses of voltage to obtain a train of square wave pulses of width approximating that of the carrier square wave pulses and whose leading and trailing edges vary together in phase in comparison with the corresponding edges of the carrier wave, simultaneously with recording the carrier wave on said one channel supplying said train of square wave pulses obtained in the preceding step to a second recording head to record the train on a second channel of the record medium parallel to the first channel, playing back both channels simultaneously and comparing the instantaneous phases of the train and the carrier to obtain a wave of width-modulated pulses of voltage, and integrating said wave of width-modulated pulses to retrieve the original signal.

4. The method of claim 3 including the step of shifting the phase of the carrier by a predetermined amount before modulating the width of the pulses thereof with the signal.

5. Apparatus for recording a signal on a magnetic record member including means for providing a carrier consisting of periodic square waves of voltage, means for recording the carrier on one channel of a record member, means for modulating the width of the square waves of the carrier in accordance with the instantaneous amplitude of a signal, means for differentiating the output of said modulating means to obtain positive spikes corresponding to the leading edges and negative spikes corresponding to the trailing edges of the pulse-width-modulated signal, means for clipping all of the pulses of one polarity corresponding to the edges of the square waves other than those varied in phase by the modulating means, means for stretching the retained spikes into square wave pulses of width corresponding to that of the pulses of the original carrier wave, and means for recording the stretched pulses on a second channel of the record member parallel to the first channel.

6. The apparatus of claim 5 including means for shifting the phase of the carrier wave by a predetermined constant amount before supplying it to said modulating means.

7. The apparatus of claim 5 including means for reproducing the original signal comprising means for detecting the carrier wave recorded on said one channel of the magnetic record member to produce a first train of pulses of voltage, means for detecting the modulated train from the second channel of the magnetic record member to produce a second train of pulses of voltage, means for comparing the instantaneous phase of the first and second trains of pulses, and means for integrating the output of the phase comparing means.

No references cited.